(12) United States Patent
Chiu et al.

(10) Patent No.: US 7,065,421 B2
(45) Date of Patent: Jun. 20, 2006

(54) MANUFACTURING MANAGEMENT SYSTEM AND METHOD

(75) Inventors: Wen-Jen Chiu, Hsinchu (TW); Wei-Chin Hsiao, Hsinchu (TW); Cheng-Che Chen, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 51 days.

(21) Appl. No.: 10/864,199

(22) Filed: Jun. 9, 2004

(65) Prior Publication Data

US 2005/0278048 A1    Dec. 15, 2005

(51) Int. Cl.
*G06F 19/00*     (2006.01)
(52) U.S. Cl. .......................... 700/100; 700/95; 700/99
(58) Field of Classification Search ................. 700/95, 700/99, 100
See application file for complete search history.

(56) References Cited

U.S. PATENT DOCUMENTS

| 6,345,259 B1 * | 2/2002 | Sandoval ...................... 705/7 |
| 6,487,473 B1 * | 11/2002 | Beck et al. ................. 700/134 |
| 6,606,529 B1 * | 8/2003 | Crowder et al. ............ 700/100 |
| 6,748,287 B1 * | 6/2004 | Hagen et al. ................. 700/99 |
| 6,751,519 B1 * | 6/2004 | Satya et al. ................. 700/121 |
| 2003/0200130 A1* | 10/2003 | Kall et al. ..................... 705/8 |
| 2004/0153187 A1* | 8/2004 | Knight et al. ................. 700/99 |

* cited by examiner

*Primary Examiner*—Jayprakash N. Gandhi
(74) *Attorney, Agent, or Firm*—Thomas, Kayden, Horstemeyer & Risley

(57) ABSTRACT

A manufacturing management system and method. The system includes a monitor module and a planning module. The monitor module receives real-time yield information of one product currently being processed in a production line. The planning module dynamically manages a manufacturing schedule of the product by holding lots corresponding to the product to avoid being processed if the yield information is greater than a target yield, and releasing additional lots corresponding to the product to be processed by the production line if the yield information is less than the target yield.

12 Claims, 4 Drawing Sheets

MANUFACTURING MANAGEMENT SYSTEM AND METHOD

BACKGROUND

The present invention relates to supply chain management, and particularly to a manufacturing management system and method with real-time yield information.

In the supply of products, the supply chain performs the functions of material purchasing, transformation of materials into intermediate and finished products, and distribution of finished products to clients. Supply chain management has become important in meeting the goals of reduced inventory, increased productivity, and enhanced competitiveness. Manufacturing and distribution facilities have limited resources and capacity, hence, not every client request may be met. For example, some requests may be promised but unfulfilled, some clients may receive inadequate supply, and other requests may be rejected. Consequently, effective management of capacity in supply chain management, without excess capacity loss is important for product suppliers who need to control manufacture or distribution.

In the supply chain, clients transmit demands to a supplier. The demand may include a request for a particular quantity of a device design by a specific date. The supplier plans its internal or external manufacturing schedule according to these received demands, and allocates capacity for manufacturing products to satisfy each client. After receiving orders corresponding to demands from clients, the supplier begins manufacturing the products.

In the foundry business, two business models, die buy and wafer buy models, are widely used. In the die buy model, clients provide orders and demands with die quantity to a supplier, and without considering the impact on product yield. In the wafer buy model, clients provide orders and demands with wafer quantity to a supplier, and take risk of product yield. In product manufacturing, product yield fluctuates, trending up with manufacturing experience or trending down with abnormal events. In the die buy model, if the product yield trends up, the output die quantity will exceed client requirements, and the supplier must bank or scrap excess dies, thereby increasing production cost. If the product yield decreases, the output die quantity will not meet client requirements.

FIG. 1 shows a conventional manufacturing cycle. Conventionally, a client 100 determines orders 100 according to yield history information, and transmits the orders 100 to a supplier. The supplier then manufactures products corresponding to the orders 110 (120), and performs circuit probe test on the products (130). The yield test result is fed back to the client 100 as yield history information for subsequent orders. Since clients determine orders according to the product yield in the wafer buy model, real-time yield information is important for clients in making order request decisions. In the conventional manufacturing cycle, however, the yield information is obtained only after the products have been manufactured and tested, and the yield information can be only referred to in the next manufacturing cycle. Thus there may be a delay in product to market time, and lost competitiveness. There is no effective mechanism to provide real-time yield information for demand planning and WIP (Work In Process) adjustment, to thereby meet client demands and reduce supplier cost.

SUMMARY

Embodiments of the present invention are proposed to address the aforementioned issues. It is noted that these embodiments, among others, are applicable to any factory, service supplier, and/or product.

Accordingly, an object of the present invention is to provide manufacturing management systems and methods with real-time yield information.

To achieve the above object, the present invention provides a manufacturing management system and method. According to one embodiment of the invention, the system includes a monitor module and a planning module. The monitor module receives real-time yield information of one product currently being processed in a production line. The planning module dynamically manages a manufacturing schedule of the product according to the yield information.

The planning module further compares the yield information with a target value, and dynamically manages the manufacturing schedule of the product according to the compared result.

The planning module further holds lots corresponding to the product to avoid being processed if the yield information is greater than the target value.

The planning module further releases additional lots corresponding to the product to be processed by the production line if the yield information is less than the target value.

The system further comprises a notification module to provide the yield information to a client requesting an order for the product if the yield information is greater or less than a predetermined ratio with the target value.

The system further comprises an order management module to receive the order and a supplemental order indicating the additional lots corresponding to the product from the client, and the plan engine releases the additional lots according to the supplemental order.

According to another embodiment of the invention, a manufacturing management method is provided. First, real-time yield information of one product currently processed in a production line is received. A manufacturing schedule of the product is then dynamically managed according to the yield information.

The yield information is further compared with a target value, and the manufacturing schedule of the product is dynamically managed according to the compared result.

Lots corresponding to the product are further held to avoid being processed if the yield information is greater than the target value.

Additional lots corresponding to the product are further released to be processed by the production line if the yield information is less than the target value.

The yield information is further provided to a client requesting an order for the product if the yield information is greater or less than a predetermined ratio with the target value.

The order and a supplemental order indicating the additional lots corresponding to the product are received from the client, and the additional lots are released according to the supplemental order.

The above-mentioned method may take the form of program code embodied in a tangible media. When the program code is loaded into and executed by a machine, the machine becomes an apparatus for practicing the disclosed methods.

BRIEF DESCRIPTION OF THE DRAWINGS

The aforementioned objects, features and advantages will become apparent by referring to the following detailed description of the preferred embodiment with reference to the accompanying drawings, wherein.

DESCRIPTION

The present disclosure provides systems and methods for overcoming conventional manufacturing management problems.

Figure 1:
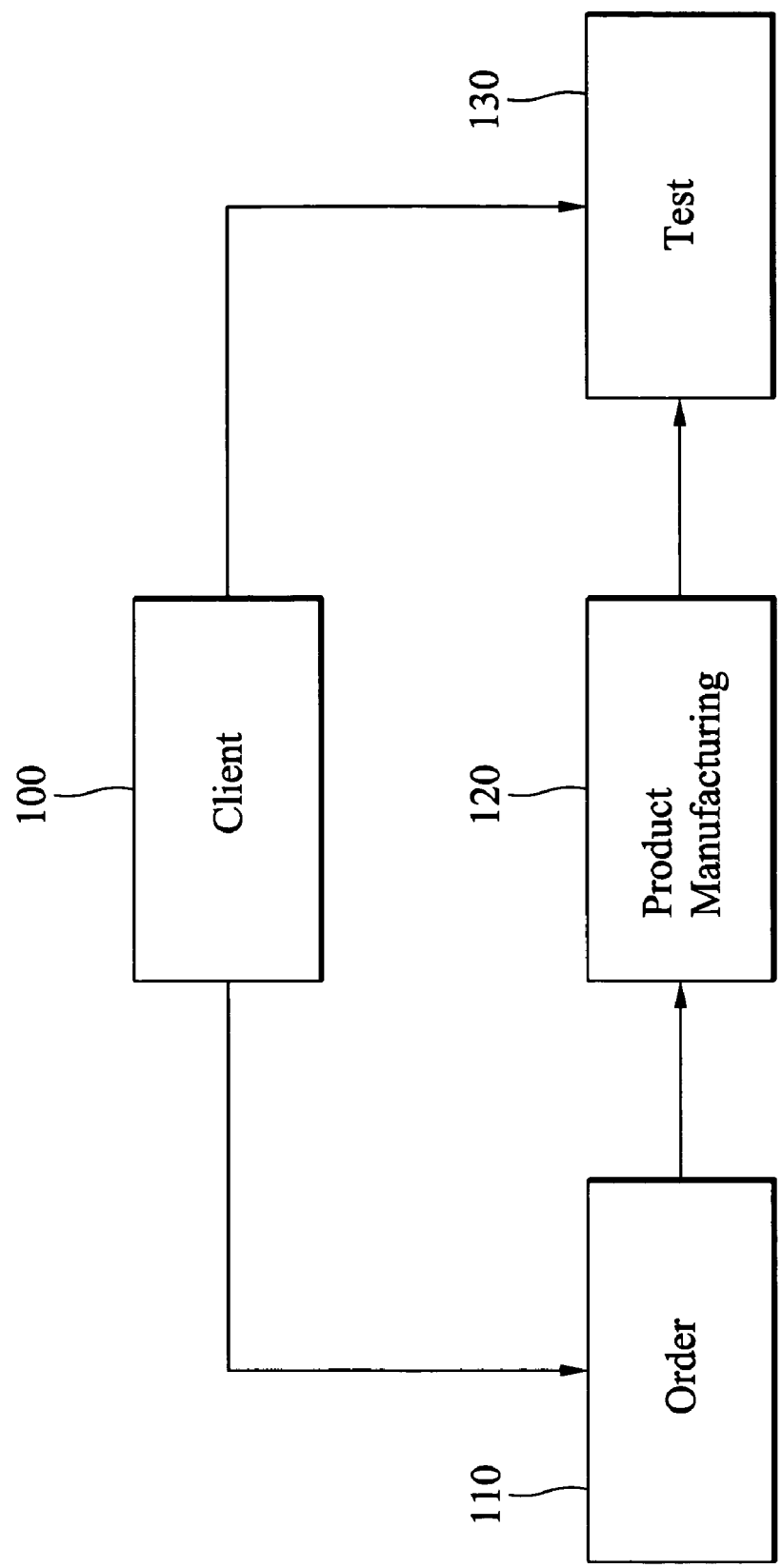
FIG. 1 is a schematic diagram illustrating a conventional manufacturing cycle.
Figure 2:
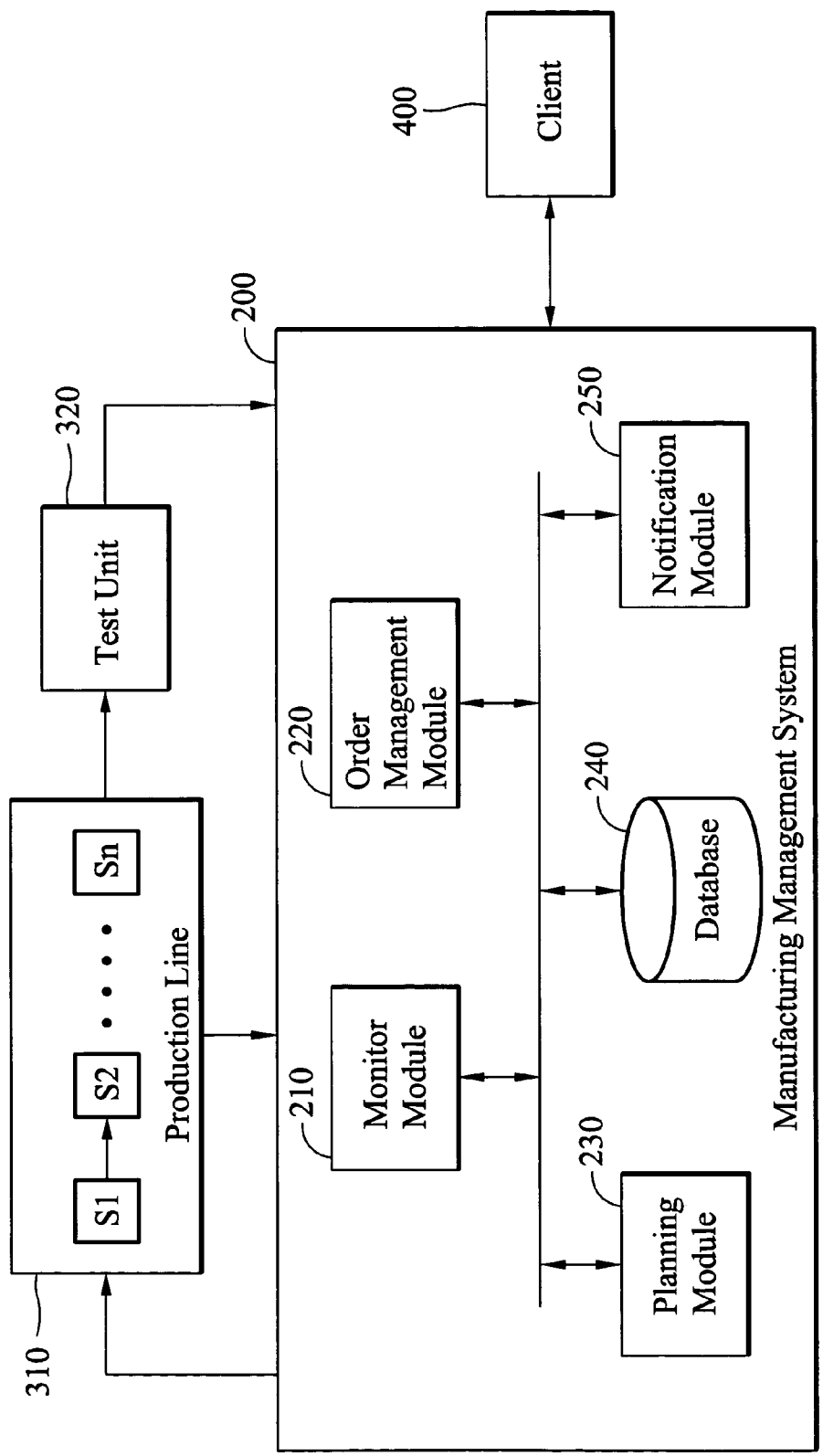
FIG. 2 is a schematic diagram illustrating the architecture of the manufacturing management system according to one embodiment of the present invention.

FIG. 2 is a schematic diagram illustrating the architecture of the manufacturing management system according to one embodiment of the present invention. The manufacturing management system 200 includes a monitor module 210, an order management module 220, a planning module 230, a database 240, and a notification module 250.

The monitor module 210 receives real-time yield information of products currently being processed in a production line 310. The production line 310 includes a plurality of stages or steps S1, S2 . . . Sn, and each stage or step may perform yield tests, such as circuit probe tests on WIPs. The test results comprising the yield information of respective stages can be integrated and transmitted to the monitor module 210. It is understood that the yield information can be obtained using any yield analysis method. The monitor module 210 stores the yield information in the database 240 for further analysis and statistics purposes. The database 240 further stores a target yield for each product. The target yield can be set according to history yield data generated by a test unit 320 in a previous manufacturing cycle.

The order management module 220 receives demands or orders from clients 400. Each demand or order comprises a request for a particular quantity of a product and a corresponding required date. As described above, the demand and order may be constructed in the die buy model or the wafer buy model. It is understood that several embodiments of the present invention can be integrated with a web-based platform, which provides online service and displays related information to clients. The notification module 250 further transmits related information to the clients 400. The planning module 230 dynamically manages a manufacturing schedule for each product according to corresponding real-time yield information. The detailed operation is described later.

Figure 3:
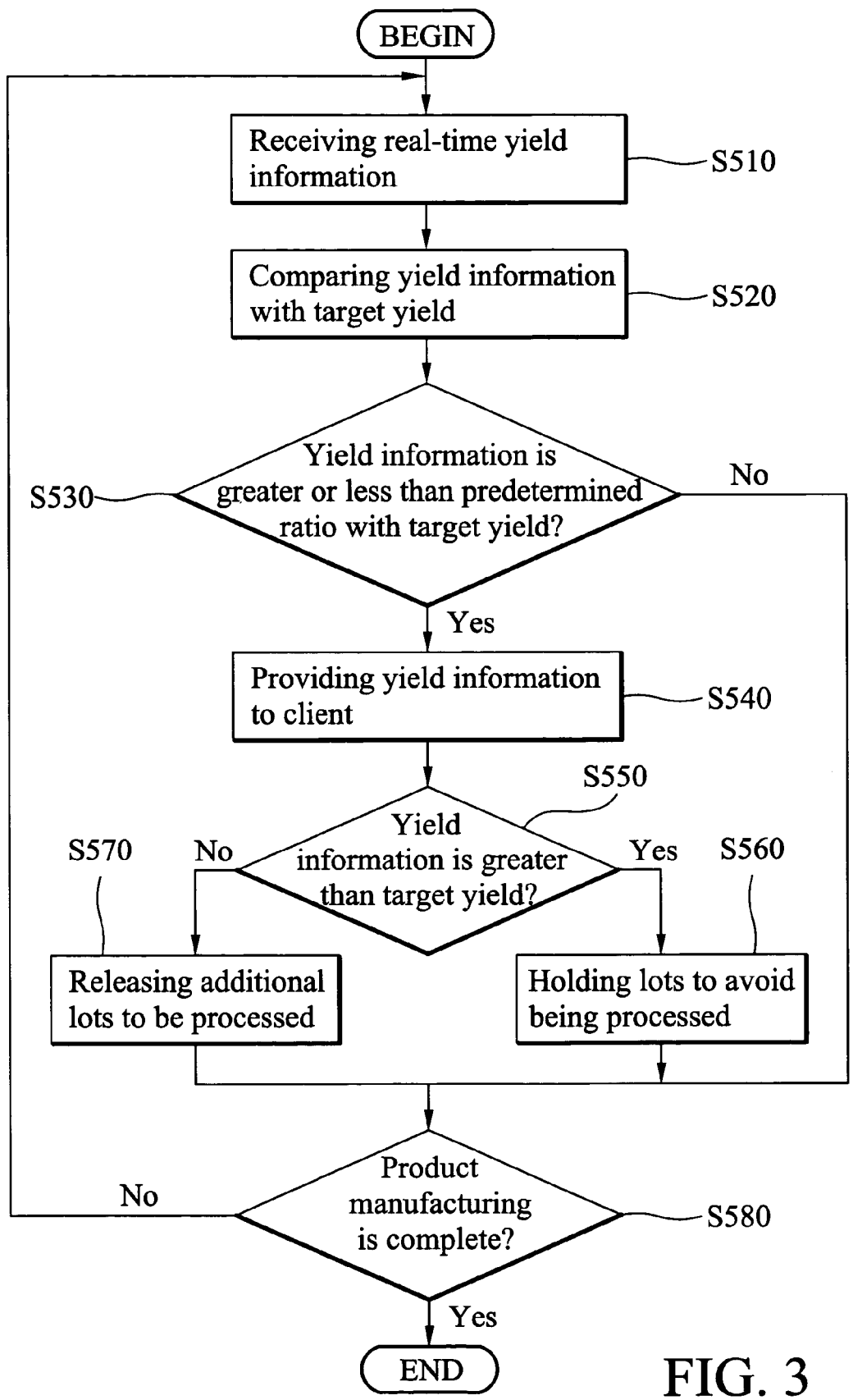
FIG. 3 is a flowchart showing the process of manufacturing management according to one embodiment of the present invention.

FIG. 3 is a flowchart showing the process of manufacturing management according to one embodiment of the present invention.

First, in step S510, the monitor module 210 receives real-time yield information of one product currently processed in the production line 310. It is understood that the product is manufactured according to an order with a specific quantity from the client 400. Then, in step S520, the planning module 230 compares the yield information with a target yield for the product.

Thereafter, in step S530, it is determined whether the yield information is greater or less than a predetermined ratio with the target yield. If no (No in step S530), in step S580, it is determined whether the product manufacturing for the product is complete or if the manufactured quantity for the product is fulfilled. If yes (Yes in step S580), the procedure is complete. If no (No in step S580), the flow returns to step S510. If the yield information is greater or less than a predetermined ratio with the target yield (Yes in step S530), in step S540, the notification module 250 provides and informs the yield information to the client 400. It is understood that related information, such as handling proposals for excess dies or supplemental order requests can be also transmitted to the client 400 requesting the product for approval.

If the yield information is greater than the target yield (Yes in step S550), in step S560, the planning module 230 holds lots corresponding to the product to avoid being processed by the production line 310. The held lots are originally designated for the order. If the yield information is less than the target yield (No in step S550), in step S570, the planning module 230 releases additional lots corresponding to the product to be processed by the production line 310. It is understood that the additional lots are released according to the supplemental order approved and transmitted by the client 400.

Thereafter, in step S580, it is determined whether the product manufacturing for the product is complete or if the manufactured quantity for the product is fulfilled. If yes (Yes in step S580), the procedure is complete. If no (No in step S580), the flow returns to step S510.

Figure 4:
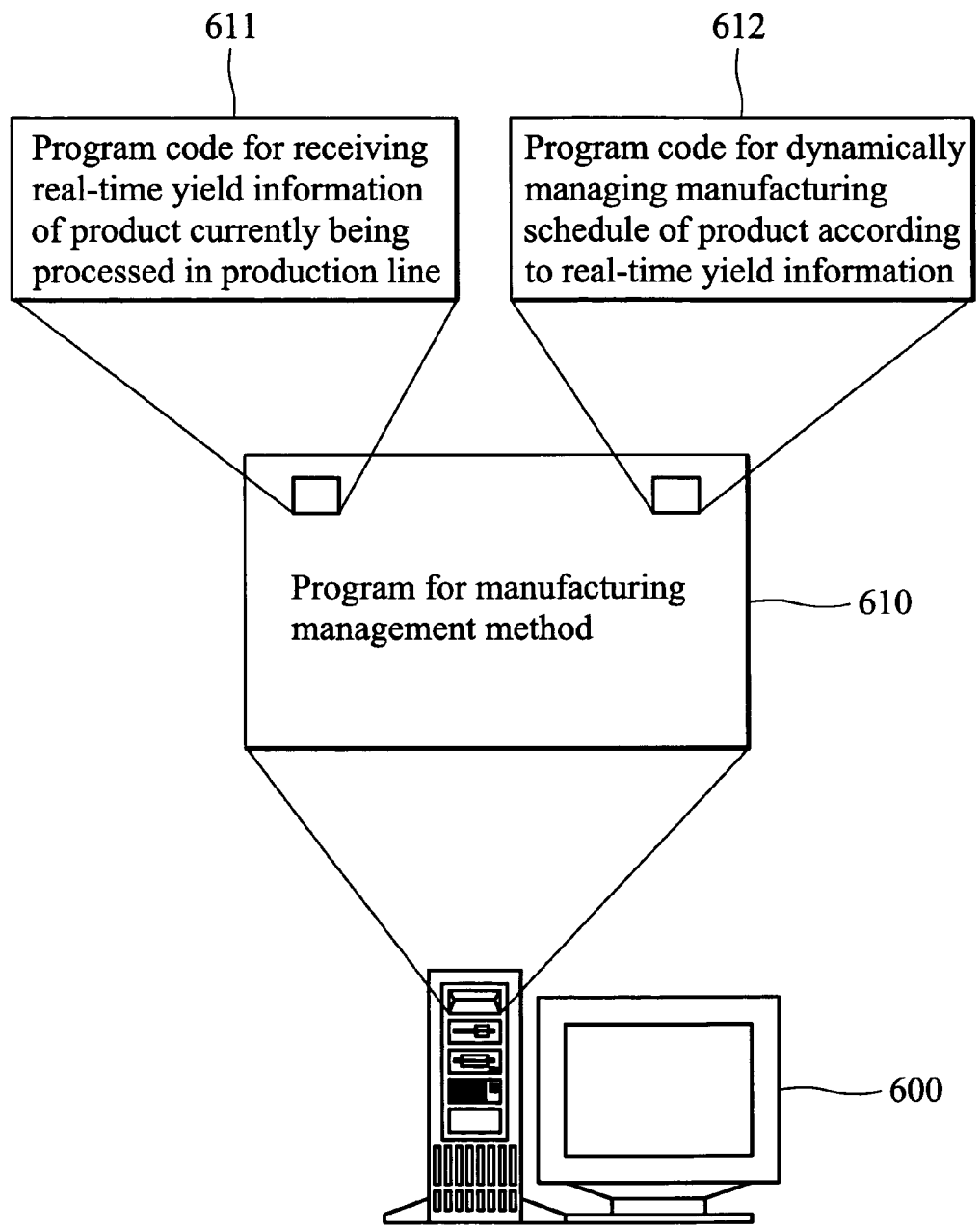
FIG. 4 is a schematic diagram illustrating a storage medium for storing a computer program for execution of the manufacturing management method according to one embodiment of the present invention.

FIG. 4 is a diagram of a storage medium for storing a computer program providing the manufacturing management method according to one embodiment of the present invention. The computer program product comprises a storage medium 610 having computer readable program code embodied in the medium for use in a computer system 600. The computer readable program code comprises computer readable program code 611 receiving real-time yield information of one product currently being processed in a production line, and computer readable program code 612 dynamically managing a manufacturing schedule of the product according to the real-time yield information. The program further comprises computer readable program code (not shown) comparing the yield information with a target yield, computer readable program code (not shown) holding lots corresponding to the product to avoid being processed if the yield information is greater than the target yield, and computer readable program code (not shown) releasing additional lots corresponding to the product to be processed by the production line if the yield information is less than the target yield. Moreover, the program further comprises computer readable program code (not shown) providing the yield information to a client requesting an order for the product if the yield information is greater or less than a predetermined ratio with the target yield.

The disclosed embodiments provide manufacturing management systems and methods with capable of providing real-time yield information for demand planning and WIP adjustment and dynamically manage manufacturing schedules, thereby meeting client demands and saving supplier cost.

The embodiments of the methods and systems, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the disclosed methods. The methods and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although several embodiments of the present invention have been described, it is not intended to limit the invention to the precise embodiments disclosed herein. Those skilled in this technology can still make various alterations and modifications without departing from the scope and spirit of this invention.

What is claimed is:

1. A manufacturing management system, comprising:
   a monitor module to receive real-time yield information of one product currently being processed in a production line;
   a planning module to dynamically manage a manufacturing schedule of the product according to the yield information;
   a notification module to provide the yield information to a client requesting an order for the product if the yield information is greater or less than a predetermined ratio with a target yield; and
   an order management module to receive the order and a supplemental order indicating the additional lots corresponding to the product from the client, wherein the planning module releases the additional lots according to the supplemental order.

2. The system of claim 1 wherein the planning module further compares the yield information with the target yield, and dynamically manages the manufacturing schedule of the product according to the compared result.

3. The system of claim 2 wherein the planning module further holds lots corresponding to the product to avoid being processed if the yield information is greater than the target yield.

4. The system of claim 2 wherein the planning module further releases additional lots corresponding to the product to be processed by the production line if the yield information is less than the target yield.

5. A computer-implemented manufacturing management method, comprising the steps of:
   receiving real-time yield information of one product currently being processed in a production line;
   dynamically managing a manufacturing schedule of the product according to the yield information;
   provide the yield information to a client requesting an order for the product if the yield information is greater or less than a predetermined ratio with a target yield; and
   receive the order and a supplemental order indicating the additional lots corresponding to the product from the client, wherein the additional lots are released according to the supplemental order.

6. The computer-implemented method of claim 5 further comprising comparing the yield information with the target yield, and dynamically managing the manufacturing schedule of the product according to the compared result.

7. The computer-implemented method of claim 6 further comprising holding lots corresponding to the product to avoid being processed if the yield information is greater than the target yield.

8. The computer-implemented method of claim 6 further comprising releasing additional lots corresponding to the product to be processed by the production line if the yield information is less than the target yield.

9. A machine-readable storage medium storing a computer program, the computer program, when executed, causing a computer to perform a manufacturing management method, the method comprising the steps of:
   receiving real-time yield information of one product currently being processed in a production line;
   dynamically managing a manufacturing schedule of the product according to the yield information;
   provide the yield information to a client requesting an order for the product if the yield information is greater or less than a predetermined ratio with a target yield; and
   receive the order and a supplemental order indicating the additional lots corresponding to the product from the client, wherein the additional lots are released according to the supplemental order.

10. The storage medium of claim 9 wherein the method further comprises comparing the yield information with the target yield, and dynamically managing the manufacturing schedule of the product according to the compared result.

11. The storage medium of claim 10 wherein the method further comprises holding lots corresponding to the product to avoid being processed if the yield information is greater than the target yield.

12. The storage medium of claim 10 wherein the method further comprises releasing additional lots corresponding to the product to be processed by the production line if the yield information is less than the target yield.

* * * * *